(12) United States Patent
Uno et al.

(10) Patent No.: US 9,878,647 B2
(45) Date of Patent: Jan. 30, 2018

(54) VEHICLE SEAT

(71) Applicant: TOYOTA BOSHOKU KABUSHIKI KAISHA, Aichi-ken (JP)

(72) Inventors: Yosuke Uno, Aichi-ken (JP); Masashi Yanagawa, Aichi-ken (JP); Koji Saito, Aichi-ken (JP); Masahiko Onuma, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 121 days.

(21) Appl. No.: 14/978,189

(22) Filed: Dec. 22, 2015

(65) Prior Publication Data
US 2016/0185263 A1    Jun. 30, 2016

(30) Foreign Application Priority Data
Dec. 26, 2014    (JP) ................... 2014-264748

(51) Int. Cl.
*F16D 31/02*    (2006.01)
*B60N 2/66*    (2006.01)
*F15B 11/068*    (2006.01)

(52) U.S. Cl.
CPC ............ *B60N 2/665* (2015.04); *F15B 11/068* (2013.01); *F15B 2211/324* (2013.01)

(58) Field of Classification Search
CPC ............ F15B 11/068; F15B 2211/324; B60N 2/4415; B60N 2/665
See application file for complete search history.

(56) References Cited

U.S. PATENT DOCUMENTS 4,633,763 A * 1/1987 Manning ............... A47C 7/467
137/883
4,655,505 A * 4/1987 Kashiwamura ...... B60N 2/4415
297/284.6

(Continued)

FOREIGN PATENT DOCUMENTS

JP    58-44948    9/1981
JP    60-45438    3/1985
JP    60-116983    6/1985

(Continued)

OTHER PUBLICATIONS

Office Action issued in Japan Counterpart Patent Appl. No. 2014-264748, dated Oct. 24, 2017, along with an English translation thereof.

*Primary Examiner* — Michael Leslie
(74) *Attorney, Agent, or Firm* — Greenblum & Bernstein, P.L.C.

(57) ABSTRACT

A vehicle seat includes a bladder as an actuator; a pump that is operated to supply air to the bladder; a switch that is operated to operate the pump; and a switching valve that is disposed in an air supply/discharge passage for the air for the bladder, the switching valve being configured to connect the air supply/discharge passage to a discharge port of the pump when the air is supplied to the bladder, and to connect the air supply/discharge passage to an exhaust port when the air is discharged from the bladder. The switching valve is incorporated in the switch, and is configured to receive an operating force applied to the switch, and to supply and discharge the air to and from the bladder in accordance with an operation of the switch.

6 Claims, 17 Drawing Sheets

(56) References Cited

U.S. PATENT DOCUMENTS

| | | | | |
|---|---|---|---|---|
| 4,915,124 A | * | 4/1990 | Sember, III | A47C 7/467 137/223 |
| 5,893,609 A | * | 4/1999 | Schmidt | A47C 7/467 297/DIG. 3 |

FOREIGN PATENT DOCUMENTS

| | | |
|---|---|---|
| JP | 61-151546 | 9/1986 |
| JP | 6-38853 | 2/1994 |
| JP | 2000-279467 | 10/2000 |
| JP | 2005-040625 | 2/2005 |

* cited by examiner

F I G . 16
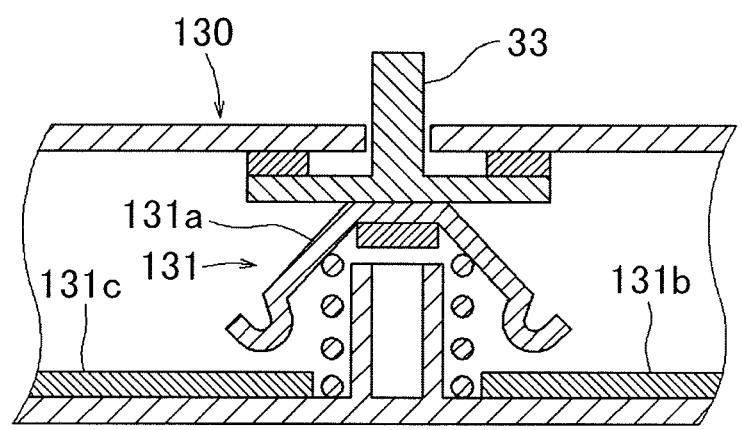

VEHICLE SEAT

INCORPORATION BY REFERENCE

The disclosure of Japanese Patent Application No. 2014-264748 filed on Dec. 26, 2014 including the specification, drawings and abstract is incorporated herein by reference in its entirety.

BACKGROUND OF THE INVENTION

1. Field of the Invention

The invention relates to a seat that includes a functional component such as a lumbar support, and is mounted in a vehicle such as an automobile, an aircraft, a vessel or a train.

2. Description of Related Art

In systems in which a bladder (an air bag) is used as an actuator (for example, in a lumbar support, a massage device, and a side support), in order to supply and discharge air to and from the bladder, an air pump and an electromagnetic valve for selecting an air supply passage or an air discharge passage are generally used. Japanese Patent Application Publication No. 2000-279467 (JP 2000-279467 A) describes an example of a massage device including an air pump and an electromagnetic valve.

However, in recent years, various functions have been added to a vehicle seat. Thus, a space around the seat is likely to become insufficient. Therefore, it may be difficult to add such various systems as described above to the vehicle seat in some cases.

SUMMARY OF THE INVENTION

The present invention simplifies a configuration of a system in which a bladder is used as an actuator, by integrating a function of a switching valve with a switch provided to control a pump.

An aspect of the invention relates to a vehicle seat including a bladder as an actuator; a pump that is operated to supply air to the bladder; a switch that is operated to operate the pump; and a switching valve that is disposed in an air supply/discharge passage for the air for the bladder, the switching valve being configured to connect the air supply/discharge passage to a discharge port of the pump when the air is supplied to the bladder, and to connect the air supply/discharge passage to an exhaust port when the air is discharged from the bladder. The switching valve is incorporated in the switch, and is configured to receive an operating force applied to the switch, and to supply and discharge the air to and from the bladder in accordance with an operation of the switch.

In the above aspect, the air supply/discharge passage for the bladder may be normally connected to the discharge port of the pump; a check valve configured to allow a flow of the air from the pump toward the bladder and to block a flow of the air in an opposite direction may be provided between the discharge port of the pump and the air supply/discharge passage for the bladder; the switch may be configured to be switched between a first position to supply the air to the bladder and a second position to discharge the air from the bladder; when the switch is at the first position, a movable contact of the switch may be electrically brought into contact with a fixed contact of the switch to bring an operating circuit for the pump into a conductive state, in accordance with movement of a first operating body that has received the operating force; and when the switch is at the second position, a valve element that has cut off communication between the air supply/discharge passage for the bladder and the exhaust port may be moved to provide communication between the air supply/discharge passage for the bladder and the exhaust port, in accordance with movement of a second operating body that has received the operating force.

In the above aspect, the bladder may include a pair of bladders, and each of the pair of bladders may be configured to be individually expandable and contractible; the switch may be configured to be switched to a first position to simultaneously expand the pair of bladders, a second position to simultaneously contract the pair of bladders, a third position to expand one of the pair of bladders and contract the other bladder, and a fourth position to contract the one of the pair of bladders and expand the other bladder; when the switch is at the first position, a first movable contact of the switch may be electrically brought into contact with a first fixed contact of the switch to bring an operating circuit for the pump into a conductive state, in accordance with movement of a first operating body that has received the operating force; when the switch is at the second position, a second valve element that has cut off communication between each of the air supply/discharge passages for the pair of bladders and the exhaust port may be moved to provide the communication between each of the air supply/discharge passages for the pair of bladders and the exhaust port, in accordance with movement of a second operating body that has received the operating force; when the switch is at the third position, in accordance with movement of a third operating body that has received the operating force, a second movable contact of the switch may be electrically brought into contact with a second fixed contact of the switch to bring the operating circuit for the pump into the conductive state, and a third valve element that has provided communication between the air supply/discharge passage for the other bladder and the discharge port of the pump, and has cut off communication between the air supply/discharge passage for the other bladder and the exhaust port may be moved to cut off the communication between the air supply/discharge passage for the other bladder and the discharge port of the pump, and to provide the communication between the air supply/discharge passage for the other bladder and the exhaust port; and when the switch is at the fourth position, in accordance with movement of a fourth operating body that has received the operating force, a third movable contact of the switch may be electrically brought into contact with a third fixed contact of the switch to bring the operating circuit for the pump into the conductive state, and a fourth valve element that has provided communication between the air supply/discharge passage for the one bladder and the discharge port of the pump and has cut off communication between the air supply/discharge passage for the one bladder and the exhaust port may be moved to cut off the communication between the air supply/discharge passage for the one bladder and the discharge port of the pump, and to provide the communication between the air supply/discharge passage for the one bladder and the exhaust port.

In the above aspect, the bladder may include a pair of bladders, and each of the pair of bladders is configured to be individually expandable and contractible; the switch may be configured to be switched to a first position to simultaneously expand the pair of bladders, a second position to simultaneously contract the pair of bladders, a third position to expand one of the pair of bladders and contract the other bladder, and a fourth position to contract the one of the pair of bladders and expand the other bladder; when the switch is at the first position, in accordance with movement of a first operating body that has received the operating force, a first movable contact of the switch may be electrically brought into contact with a first fixed contact of the switch to bring an operating circuit for the pump into a conductive state, and a first valve element that has cut off communication between each of the air supply/discharge passages for the pair of bladders and the discharge port of the pump may be moved to provide the communication between each of the air supply/discharge passages for the pair of bladders and the discharge port of the pump; when the switch is at the second position, in accordance with movement of a second operating body that has received the operating force, a second valve element that has cut off communication between each of the air supply/discharge passages for the pair of bladders and the exhaust port may be moved to provide the communication between each of the air supply/discharge passages for the pair of bladders and the exhaust port; when the switch is at the third position, in accordance with movement of a third operating body that has received the operating force, a second movable contact of the switch may be electrically brought into contact with a second fixed contact of the switch to bring the operating circuit for the pump into the conductive state, and a third valve element that has cut off communication between the air supply/discharge passage for the one bladder and the discharge port of the pump, and has provided communication between the air supply/discharge passage for the one bladder and the exhaust port may be moved to provide the communication between the air supply/discharge passage for the one bladder and the discharge port of the pump, and to cut off the communication between the air supply/discharge passage for the one bladder and the exhaust port; and when the switch is at the fourth position, in accordance with movement of a fourth operating body that has received the operating force, a third movable contact of the switch may be electrically brought into contact with a third fixed contact of the switch to bring the operating circuit for the pump into the conductive state, and a fourth valve element that has cut off communication between the air supply/discharge passage for the other bladder and the discharge port of the pump and has provided communication between the air supply/discharge passage for the other bladder and the exhaust port may be moved to provide the communication between the air supply/discharge passage for the other bladder and the discharge port of the pump, and to cut off the communication between the air supply/discharge passage for the other bladder and the exhaust port.

In the above aspect, the switch may include a fixed contact; a movable contact that receives the operating force to move relative to the fixed contact and to electrically come in contact with the fixed contact; a valve element disposed to move together with the movable contact; a valve chamber that accommodates the valve element such that the valve element is movable, and communicates with one of the bladder, the exhaust port and the discharge port of the pump; and a valve seat that is formed in an inner wall surface of the valve chamber to constitute an end portion of a communication path communicating with one of the bladder, the exhaust port and the discharge port of the pump which does not communicate with the valve chamber, the valve seat being disposed to face the valve element such that the valve seat is able to contact the valve element. The communication path may be opened to the valve chamber in a state where the valve seat does not contact the valve element, and the communication path may be cut off from the valve chamber in a state where the valve seat contacts the valve element.

In the above aspect, the switch may include at least one of a combination of the fixed contact and the movable contact and a combination of the valve element and the valve seat.

According to the above aspect of the present invention, the function of the switching valve is integrated with the switch provided to control the pump. Consequently, by the operating force applied to the switch for pump control, a valve element provided to control air supply to and air discharge from the bladder can be moved. Accordingly, the necessity of providing an electromagnetic valve for the air supply and discharge control can be eliminated, and the system configuration can be simplified.

In addition, in the case where the electromagnetic valve is used, capacity reduction is required in view of the accommodation space for the electromagnetic valve and power consumption of the electromagnetic valve. As a result, a driving force for a valve element is restricted, and a situation in which the valve element is stuck is likely to occur. In the above aspect of the present invention, the operating force can be adjusted by an operator as required, and hence it is possible to prevent the occurrence of the situation in which the valve element is stuck.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a sectional view of a switch box for a hold mode in a fourth embodiment;

DETAILED DESCRIPTION OF EMBODIMENTS

Figure 1:
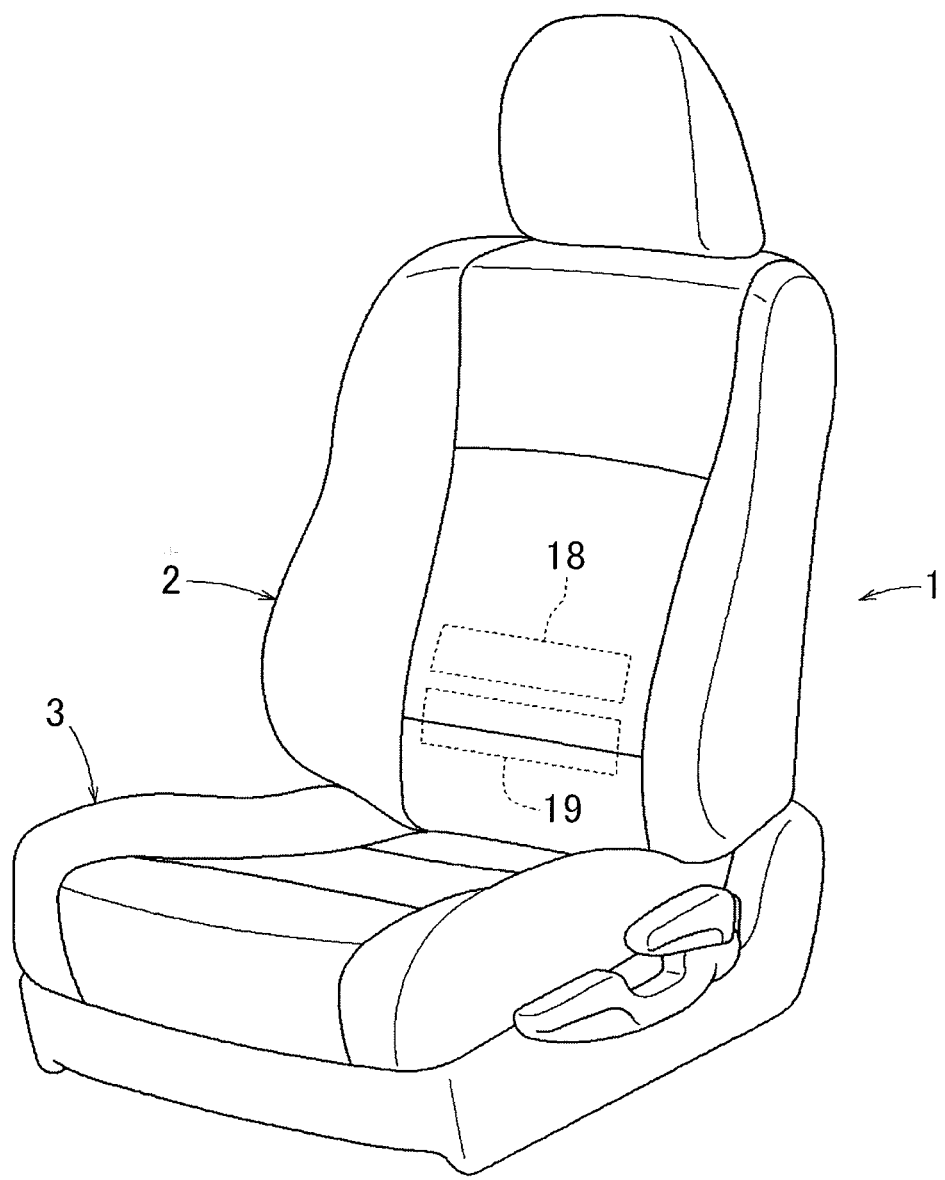
FIG. 1 is a perspective view of a first embodiment of the present invention.

FIG. 1 shows a first embodiment of the present invention. This embodiment shows an example where a lumbar support in which a bladder is used is applied to a seat 1 for a vehicle (hereinafter simply referred to as the seat). The seat 1 includes a seat cushion 3 constituting a seat part and a seat back 2 constituting a backrest, and a lumbar support is disposed at a position corresponding to a lumbar region of a seated occupant in the seat back 2. In the lumbar support, two bladders, i.e., an upper bladder 18 and a lower bladder 19 (corresponding to one bladder and the other bladder according to the present invention) are arranged in an up-down direction and are fixed to a back frame in the seat back 2, though not shown in the drawing.

Figure 2:
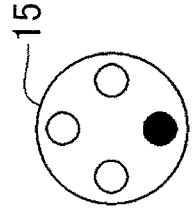
FIG. 2 is an operation explanatory view of a lumbar support in the first embodiment.

FIG. 2 is an operation explanatory view of the lumbar support in the first embodiment. An operating knob 15 of an operating switch is tilted and operated in four directions toward upper, lower, right and left sides shown by black circles in FIG. 2, to operate the upper bladder 18 and the lower bladder 19 in the seat back 2 in four modes. In a hold mode, air is supplied to both of the upper bladder 18 and the lower bladder 19 to expand both of them, thereby supporting a broad range of the lumbar region of the seated occupant. In a release mode, the air of both of the upper bladder 18 and lower bladder 19 is discharged to contract both of them, so that the lumbar region of the seated occupant is not supported. In an up mode, the air is supplied to the upper bladder 18, but the air is discharged from the lower bladder 19, and hence only the upper bladder 18 is expanded to support only a relatively high region of the lumbar region of the seated occupant. In a down mode, the air is supplied to the lower bladder 19, but the air is discharged from the upper bladder 18, and hence only the lower bladder 19 is expanded to support only a relatively low region of the lumbar region of the seated occupant.

Figure 3:
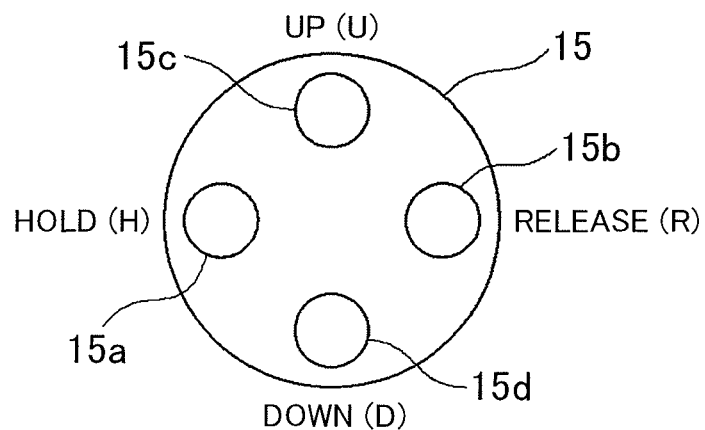
FIG. 3 is an explanatory view of an appearance of an operating knob of the lumbar support in the first embodiment.

FIG. 3 shows an appearance of the operating knob 15. In order to realize (perform) the above four modes, the operating knob 15 is configured to be tiltable and operable in the four directions with respect to an operation box 10 (see FIG. 4). That is, the knob is tilted in mutually opposite directions in the hold mode and the release mode. Specifically, when an operating portion 15a is pressed and operated, the mode is switched to the hold mode, and when an operating portion 15b is pressed and operated, the mode is switched to the release mode. In addition, the knob is tilted in mutually opposite directions, in the up mode and the down mode. Specifically, when an operating portion 15c is pressed and operated, the mode is switched to the up mode, and when an operating portion 15d is pressed and operated, the mode is switched to the down mode. A position of the operating knob 15 for performing the hold mode corresponds to a first position according to the present invention, a position of the operating knob 15 for performing the release mode corresponds to a second position according to the present invention, a position of the operating knob 15 for performing the up mode corresponds to a third position according to the present invention, and a position of the operating knob 15 for performing the down mode corresponds to a fourth position according to the present invention.

Figure 4:
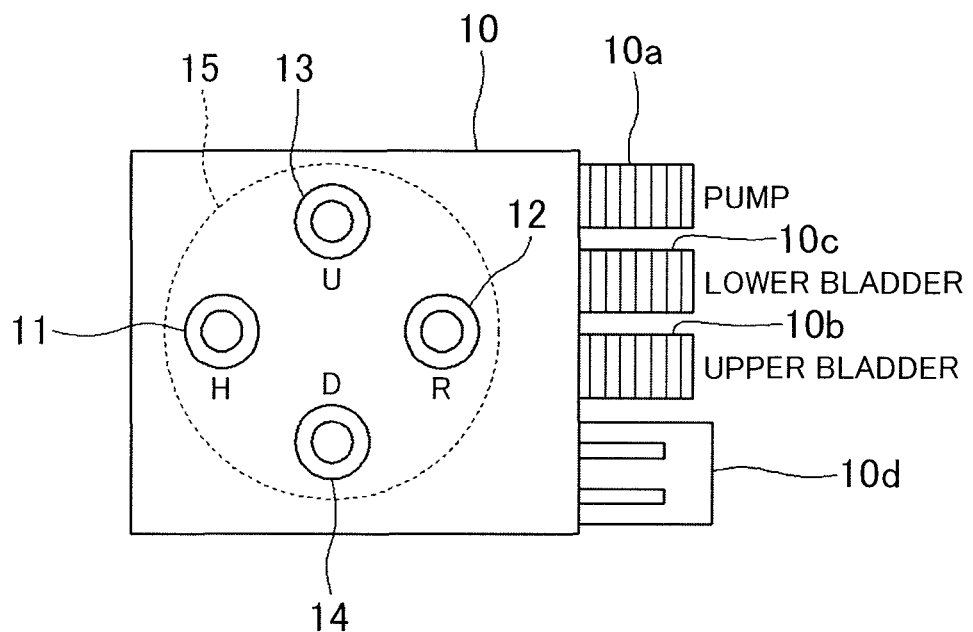
FIG. 4 is an inner configuration explanatory view of an operation box of the lumbar support in the first embodiment.

FIG. 4 shows the operation box 10 including the operating knob 15. The operation box 10 is connected to a pump 17, the upper bladder 18 and the lower bladder 19 via air connectors 10a to 10c, and is also connected to a power source and a motor 16 that drives the pump 17 via an electric connector 10d. On an upper surface of the operation box 10, the operating knob 15 mentioned above is disposed to be operable by the seated occupant on the seat 1. When the operating portions 15a to 15d corresponding to the respective modes of the operating knob 15 are pressed and operated, corresponding pushers (corresponding to first to fourth operating bodies according to the present invention) 11 to 14 are pressed, and the operation of the motor 16 and the air supply to and air discharge from the upper bladder 18 and the lower bladder 19 are controlled as described later.

Figure 5:
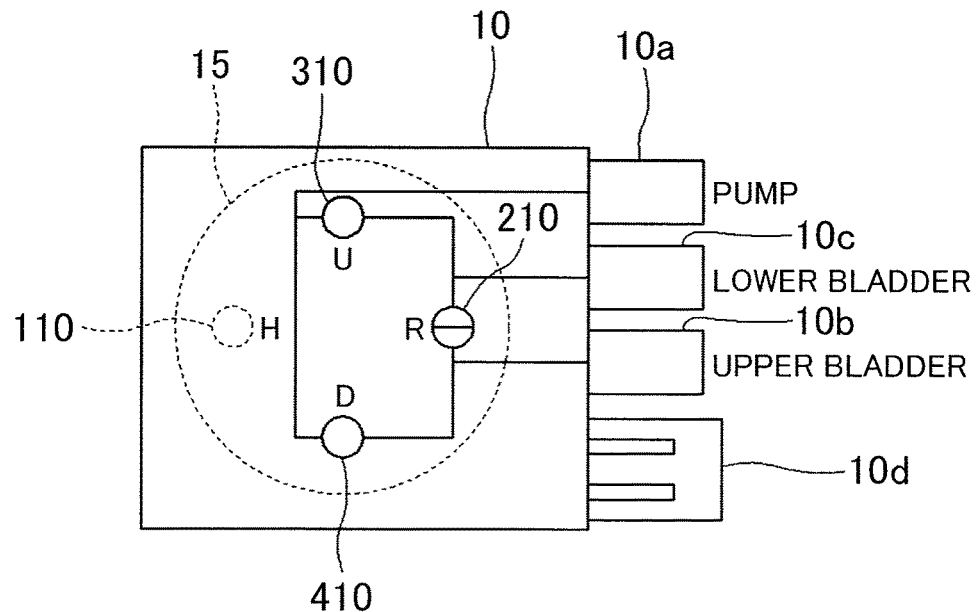
FIG. 5 is an inner configuration explanatory view of the operation box of the lumbar support in the first embodiment, and an air pipe explanatory view.

FIG. 5 shows an air pipe in the operation box 10. Switch boxes (corresponding to switches according to the present invention) 110, 210, 310 and 410 are disposed in accordance with the respective modes of the operating knob 15, and the respective switch boxes 110, 210, 310 and 410 are operated when the pushers 11 to 14 are pressed by the operation of the operating knob 15. The switch box 110 is not connected to the air pipe, the switch box 210 is connected to the upper bladder 18 and the lower bladder 19 via the air connectors 10b and 10c, and the switch boxes 310 and 410 are connected to the pump 17, the upper bladder 18 and the lower bladder 19.

Figure 6:
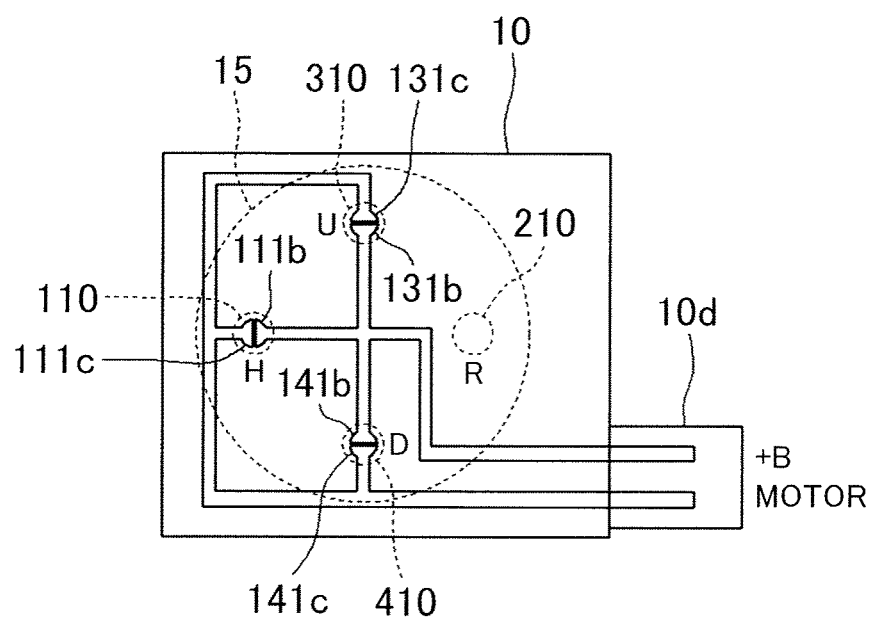
FIG. 6 is an inner configuration explanatory view of the operation box of the lumbar support in the first embodiment and an electric wire explanatory view.

FIG. 6 shows an electric wire in the operation box 10. In the switch boxes 110, 310 and 410, fixed contacts 111b and 111c, 131b and 131c, 141b and 141c, which constitute switch elements, are respectively disposed. The fixed contacts 111b, 131b and 141b are connected to a power source +B via the electric connector 10d, and the fixed contacts 111c, 131c and 141c are connected to a positive electrode terminal of the motor 16 via the electric connector 10d. Therefore, in the respective switch boxes 110, 310 and 410, when the mutually corresponding fixed contacts 111b and 111c, 131b and 131c, 141b and 141c electrically conduct to one another by after-mentioned respective movable contacts 111a, 131a and 141a (see FIG. 7), the motor 16 is operated. It is to be noted that in the switch box 210, such switch elements as in the other switch boxes 110, 310 and 410 are not disposed.

Figure 7:
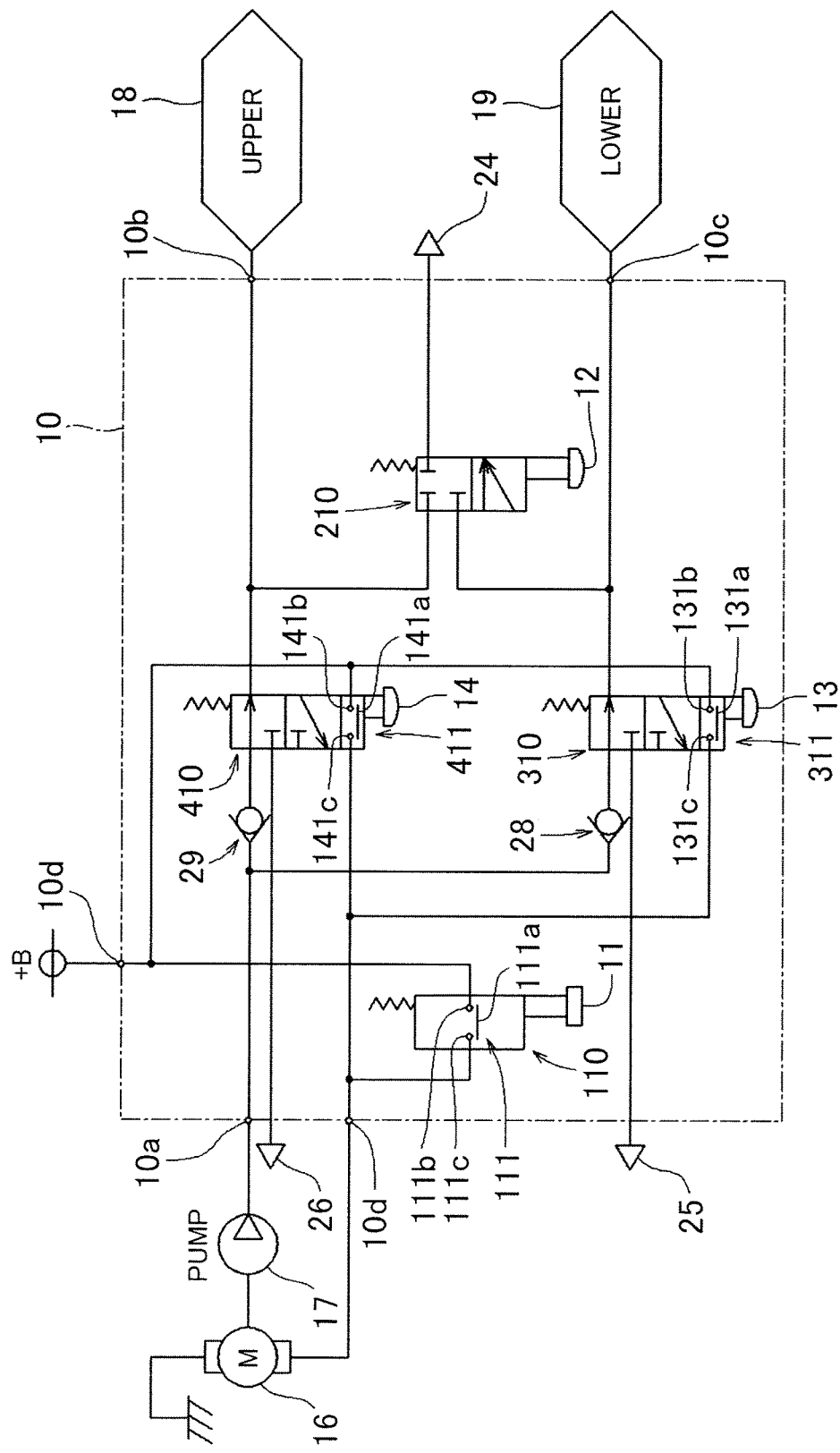
FIG. 7 is a system configuration diagram of the lumbar support in the first embodiment.

FIG. 7 shows a system configuration of the lumbar support. The pump 17 is connected to the motor 16 such that the pump 17 is driven by the motor 16, and a discharge port of the pump 17 is connected to check valves 28 and 29 in the operation box 10 via the air connector 10a. The check valves 28 and 29 are disposed in parallel with each other to be connected to the air connector 10a, and the check valve 28 is connected to the air connector 10c via a switching valve of the switch box 310, and further connected to the lower bladder 19. The check valve 28 is configured to allow a flow of air from the pump 17 toward the lower bladder 19, and to block a flow of the air in the opposite direction. An exhaust port of the switching valve of the switch box 310 is connected to an exhaust port 25.

In addition, the check valve 29 is connected to the air connector 10*b* via a switching valve of the switch box 410, and further connected to the upper bladder 18. The check valve 29 is configured to allow the flow of the air from the pump 17 toward the upper bladder 18, and to block the flow of the air in the opposite direction. An exhaust port of the switching valve of the switch box 410 is connected to an exhaust port 26. Each of the upper bladder 18 and the lower bladder 19 is connected to an exhaust port 24 via a switching valve of the switch box 210. The switching valves of the respective switch boxes 210, 310 and 410 correspond to second to fourth valve elements according to the present invention.

A negative electrode terminal of the motor 16 is grounded, a positive electrode terminal of the motor 16 is connected to the fixed contacts 111*c*, 131*c* and 141*c* of respective switch elements 111, 311 and 411 in the respective switch boxes 110, 310 and 410 via the electric connector 10*d*, and the fixed contacts 111*b*, 131*b* and 141*b* of the respective switch elements 111, 311 and 411 are connected to the power source +B via the electric connector 10*d*. Therefore, the switch elements 111, 311 and 411 are connected in parallel with one another.

Figure 10:
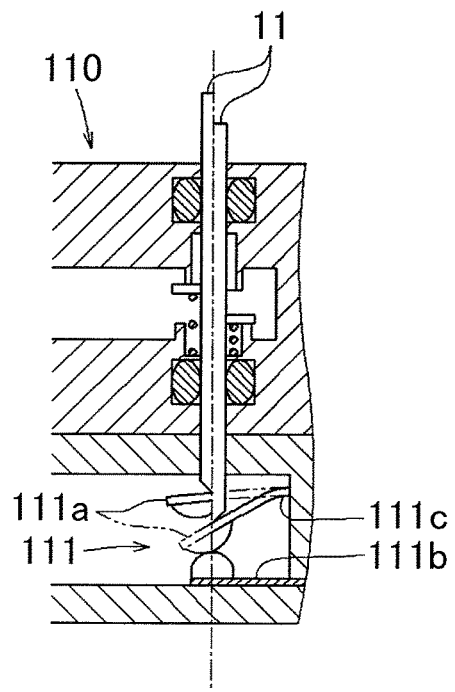
FIG. 10 is a sectional view of a switch box for a hold mode in the first embodiment.
Figure 11:
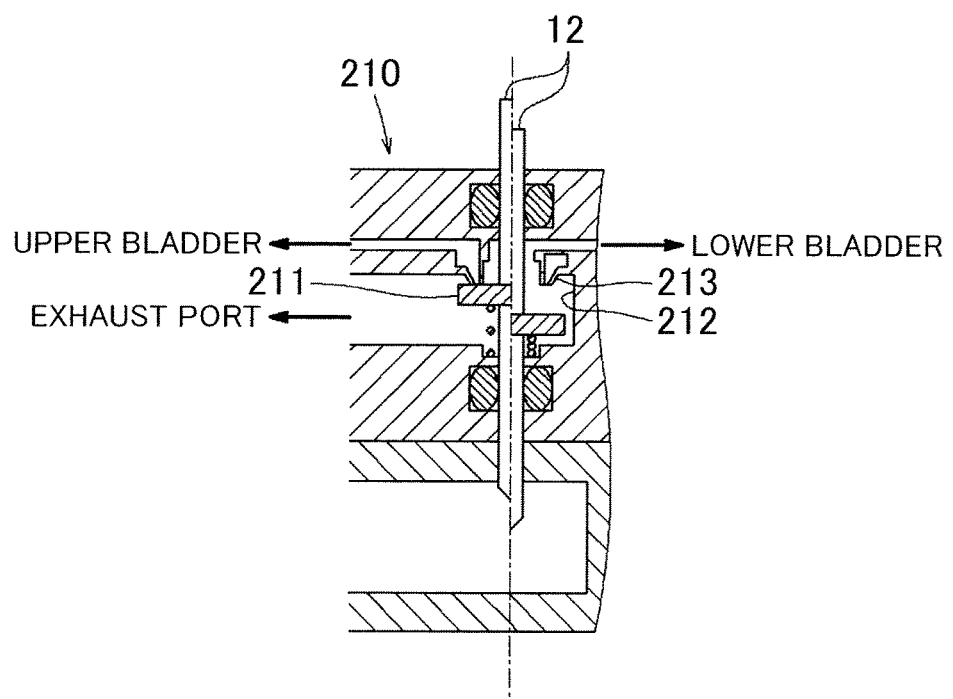
FIG. 11 is a sectional view of a switch box for a release mode in the first embodiment.
Figure 12:
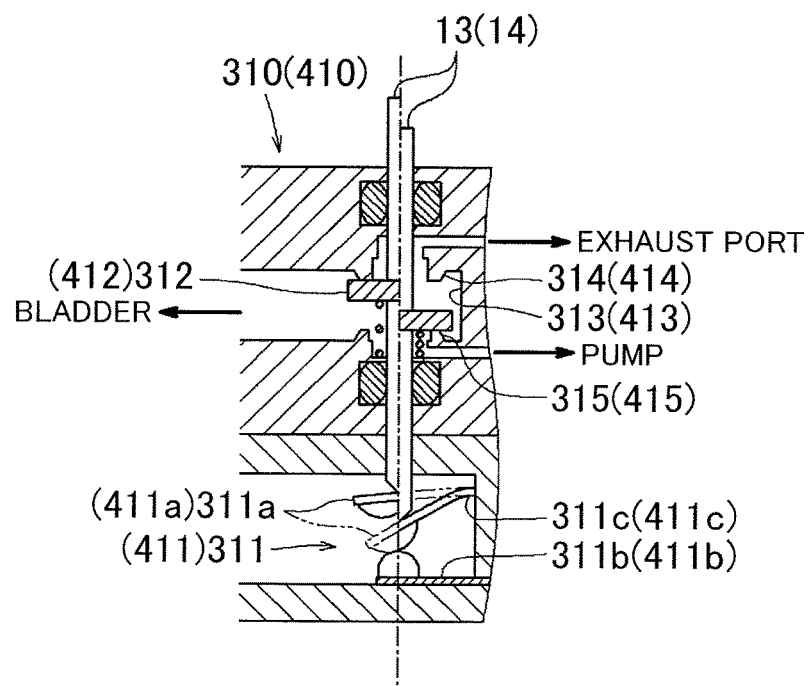
FIG. 12 is a sectional view of a switch box for an up mode and a down mode in the first embodiment.

FIGS. 10 to 12 show configurations of the switch boxes 110, 210, 310 and 410 integrally configured in the operation box 10. The switch boxes 110, 210, 310 and 410 have a generally common configuration, the switching valves are respectively disposed on upper sides in the switch boxes 110, 210, 310 and 410, and the switch elements 111, 311 and 411 are respectively disposed on lower sides in the switch boxes 110, 310 and 410. Here, upper and lower sides shown in FIGS. 10 to 12 are described as the upper and lower sides for the sake of convenience. Additionally, in each of the switch boxes 110, 210, 310 and 410, a state where the pusher 11, 12, 13 or 14 is pressed and operated, and a state where the pusher 11, 12, 13 or 14 is not pressed or operated are shown together.

In the switching valve of the switch box 310, as shown in FIG. 12, a valve element 312 is connected with the pusher 13, a valve seat 314 is disposed on the upper side to face the valve element 312, and a valve seat 315 is disposed on the lower side to face the valve element 312. The valve seats 314 and 315 are formed integrally on a wall surface of a valve chamber 313 accommodating the valve element 312. The valve element 312 is normally urged by a spring to contact the valve seat 314. When the pusher 13 is pressed against a spring force to move downward, the valve element 312 moves away from the valve seat 314 to contact the valve seat 315. The valve chamber 313 communicates with the lower bladder 19, a space continuous with (linked to) the upper side of the valve seat 314 (i.e., a space above the valve seat 314) communicates with the exhaust port 25, and further, a space continuous with (linked to) the lower side of the valve seat 315 (i.e., a space below the valve seat 315) communicates with the discharge port of the pump 17 (see FIG. 7). Consequently, the switching valve of the switch box 310 can be switched such that the lower bladder 19 normally communicates with the discharge port of the pump 17 and the lower bladder 19 communicates with the exhaust port 25 when the pusher 13 is pressed and operated. The abovementioned configuration is also common to the switch box 410, and hence FIG. 12 shows reference numerals of respective constituent elements of the switch box 410 in parentheses. Thus, the switching valve of the switch box 410 is switched such that the upper bladder 18 normally communicates with the discharge port of the pump 17 and the upper bladder 18 communicates with the exhaust port 26 when the pusher 14 is pressed and operated.

The switch element 311 of the switch box 310 includes fixed contacts 311*b* and 311*c* and a movable contact 311*a* connected to the fixed contact 311*c*, and the movable contact 311*a* is disposed to be movable by a lower end of the pusher 13. Consequently, the movable contact 311*a* is normally separated from the fixed contact 311*b*, and when the pusher 13 is pressed and operated, the movable contact 311*a* is pressed by the lower end of the pusher 13 to contact the fixed contact 311*b*, and electrically comes in contact with the fixed contact to provide conduction between both the fixed contacts 311*b* and 311*c*. In the state where the movable contact 311*a* is separated from the fixed contact 311*b*, the switch element 311 is in the off state, and in the state where the movable contact 311*a* electrically contacts the fixed contact 311*b*, the switch element 311 is in the on state.

The abovementioned configuration is also common to the switch box 410, and hence FIG. 12 shows reference numerals of respective constituent elements of the switch box 410 in parentheses. Thus, before the pusher 14 is pressed, a movable contact 411*a* is separated from a fixed contact 411*b* and a switch element 411 is in the off state, and when the pusher 14 is pressed such that the movable contact 411*a* electrically contacts the fixed contact 411*b*, the switch element 411 is in the on state.

The switch box 110 of FIG. 10 includes the switch element 111 located on the lower side of the switch box 110, but does not include any switching valve located on the upper side of the switch box 110. However, in order to match a feeling of pressing the pusher 11 with a feeling of pressing the pusher 13 of the switch box 310 mentioned above (i.e., in order that the feeling of pressing the pusher 11 should be the same as or similar to the feeling of pressing the pusher 13 of the switch box 310), a spring and a seal material similar to those of the switch box 310 are disposed around the pusher 11. A specific configuration of the switch element 111 is the same as that of the switch element 311 of the switch box 310, and the components of the switch element 111 corresponding to the components of the switch element 311 are shown by changing the reference numerals of the components of the switch element 311 to the reference numerals of the components of the switch element 111.

The switch box 210 of FIG. 11 includes the switching valve located on the upper side of the switch box 210, but does not include any switch element located on the lower side of the switch box 210. In the switching valve of the switch box 310, the valve seats 314 and 315 are respectively disposed on the upper and lower sides with respect to the valve element 312. In contrast, in the switch box 210, a valve seat 213 is provided on the upper side with respect to a valve element 211, but no valve seat is provided on the lower side with respect to the valve element 211. In addition, two spaces that are independent from each other are formed above the valve seat 213, one space communicates with the upper bladder 18, and the other space communicates with the lower bladder 19. Additionally, a valve chamber 212 accommodating the valve element 211 communicates with the exhaust port 24 (see FIG. 7). Thus, before the pusher 12 is pressed and operated, the valve element 211 is urged by a spring to contact the valve seat 213 and the upper bladder 18 and the lower bladder 19 are cut off from the exhaust port 24. When the pusher 12 is pressed and operated, the valve element 211 moves away from the valve seat 213 against an urging force of the spring and the upper bladder 18 and the lower bladder 19 communicate with the exhaust port 24.

In the first embodiment, as shown in FIG. 2, air is supplied to and discharged from the upper bladder 18 and the lower bladder 19 in each mode by operating the operating knob 15 of the operation box 10 in a corresponding direction. Hereinafter, each mode will be described.

(Hold Mode) When the pusher 11 of the switch box 110 is pressed, the switch element 111 is turned on, and the motor 16 is operated. Therefore, the air is supplied from the discharge port of the pump 17, and the air is supplied to the lower bladder 19 and the upper bladder 18 via the check valves 28 and 29 and through the switching valves of the switch boxes 310 and 410 to expand the bladders (see FIGS. 7 and 10).

(Release Mode) When the pusher 12 of the switch box 210 is pressed, the lower bladder 19 and the upper bladder 18 communicate with the exhaust port 24, and both the lower bladder 19 and the upper bladder 18 are contracted (see FIGS. 7 and 11).

(Up Mode) When the pusher 13 of the switch box 310 is pressed, the switch element 311 is turned on, and the motor 16 is operated. Consequently, the air is supplied from the discharge port of the pump 17, and the air is supplied to the upper bladder 18 via the check valve 29 and through the switching valve of the switch box 410 to expand the upper bladder 18. At this time, in the switching valve of the switch box 310, a passage through which the lower bladder 19 communicates with the discharge port of the pump 17 is cut off, and the lower bladder communicates with the exhaust port 25. In consequence, the lower bladder 19 is contracted (see FIGS. 7 and 12).

(Down Mode) When the pusher 14 of the switch box 410 is pressed, the switch element 411 is turned on, and the motor 16 is operated. Consequently, the air is supplied from the discharge port of the pump 17, and the air is supplied to the lower bladder 19 via the check valve 28 and through the switching valve of the switch box 310 to expand the lower bladder 19. At this time, in the switching valve of the switch box 410, a passage through which the upper bladder 18 communicates with the discharge port of the pump 17 is cut off, and the upper bladder 18 communicates with the exhaust port 26. Accordingly, the upper bladder 18 is contracted (see FIGS. 7 and 12).

In the first embodiment, the functions of the switching valves and the switch elements 111, 311 and 411 are integrated with the switch boxes 110, 210, 310 and 410 configured to control air supply to and air discharge from the upper bladder 18 and the lower bladder 19. Consequently, by operating forces for the switch boxes 110, 210, 310 and 410, the switch elements 111, 311 and 411 can be turned on and off, and additionally, the valve elements provided to control air supply to and air discharge from the upper bladder 18 and the lower bladder 19 can be moved. Therefore, the necessity of providing an electromagnetic valve for the air supply and discharge control can be eliminated, and the system configuration can be simplified. In the case where the electromagnetic valve is used, capacity reduction is required in view of the accommodating space for the electromagnetic valve and power consumption of the electromagnetic valve. As a result, a driving force for a valve element is restricted, and a situation in which the valve element is stuck is likely to occur. In the first embodiment, the operating forces applied to the switch boxes 110, 210, 310 and 410 can be adjusted by an operator as required, and hence it is possible to prevent occurrence of the situation in which the valve element is stuck.

Figure 8:
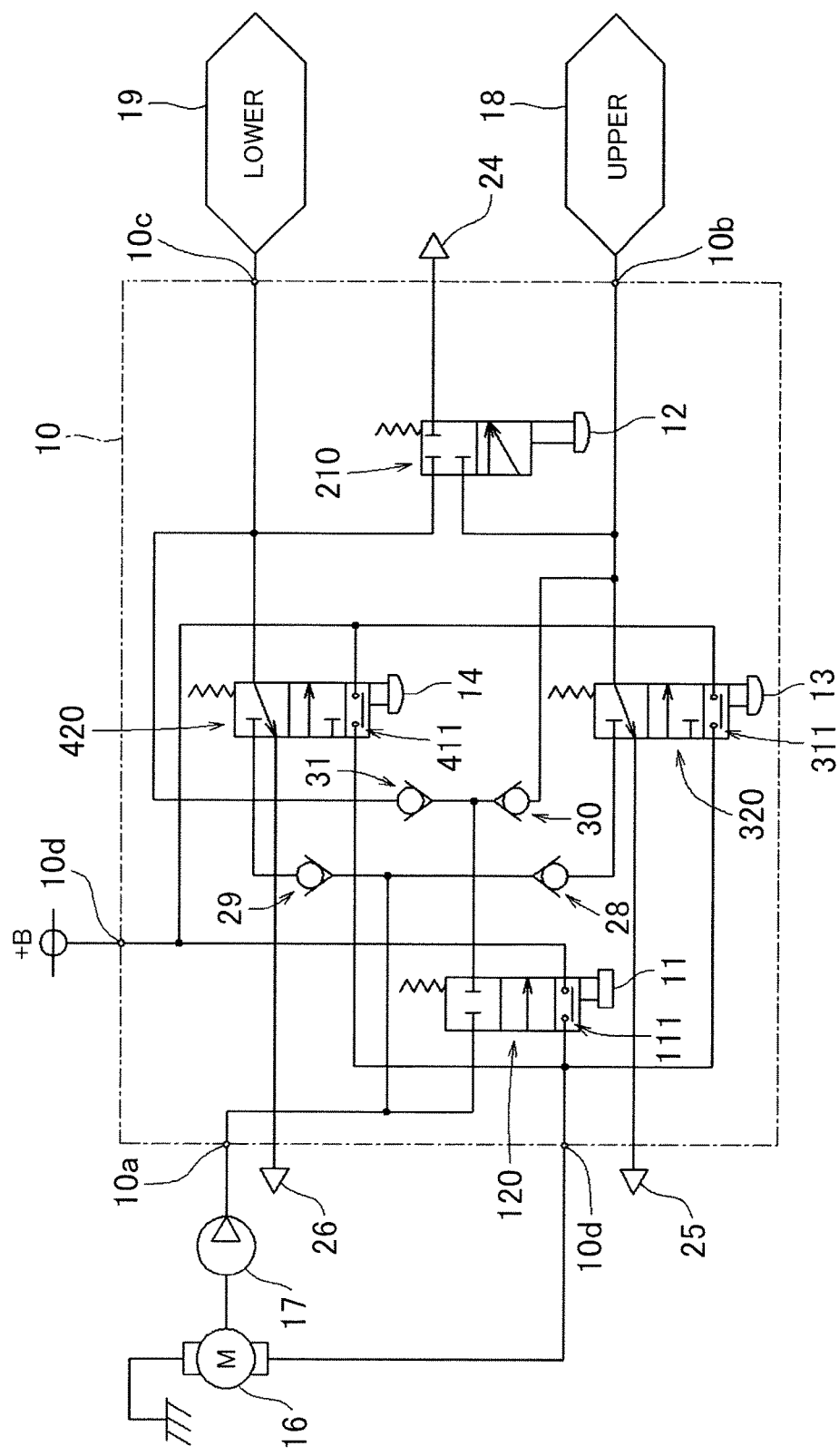
FIG. 8 is a system configuration diagram of a lumbar support in a second embodiment of the present invention.

FIG. 8 shows a second embodiment of the present invention. In the second embodiment, switch boxes 120, 320 and 420 are disposed by changing the configurations of the switching valves of switch boxes 110, 310 and 410 in the first embodiment. Specifically, the switch box 110 in the first embodiment does not include the switching valve, but the switch box 120 in the second embodiment includes a switching valve (corresponding to a first valve element according to the present invention). Additionally, in the switch boxes 320 and 420, switching modes of switching valves are inverted from switching modes of the switching valves of the switch boxes 310 and 410.

Figure 13:
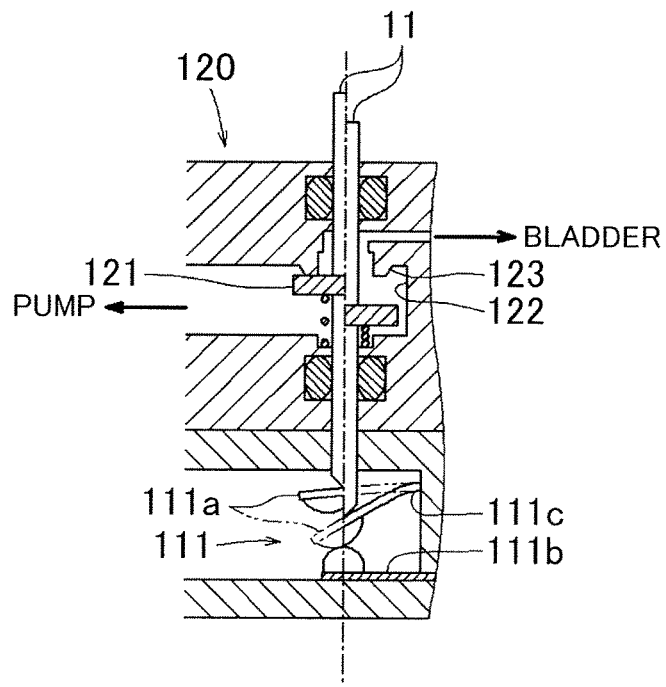
FIG. 13 is a sectional view of a switch box for a hold mode in the second embodiment.

FIG. 13 shows a configuration of the switch box 120. FIG. 13 shows the configuration corresponding to FIG. 10 showing the switch box 110 in the first embodiment. As apparent from comparison between the switch boxes, in the switch box 120 of FIG. 13, a switch element 111 is the same as that in the switch box 110. On the other hand, the switch box 110 does not include the switching valve, whereas in the switch box 120, a pusher 11 is connected with a valve element 121, and a valve seat 123 is disposed on the upper side with respect to the valve element 121 to face the valve element 121. A space continuous with the upper side of the valve seat 123 (i.e., a space above the valve seat 123) communicates with an upper bladder 18 and a lower bladder 19 via check valves 30 and 31 (see FIG. 8), and a valve chamber 122 accommodating the valve element 121 communicates with a discharge port of a pump 17. Consequently, in the switch box 120, when the pusher 11 is pressed, the switch element 111 is turned on, and simultaneously, the upper bladder 18 and the lower bladder 19 communicate with the discharge port of the pump 17.

Figure 14:
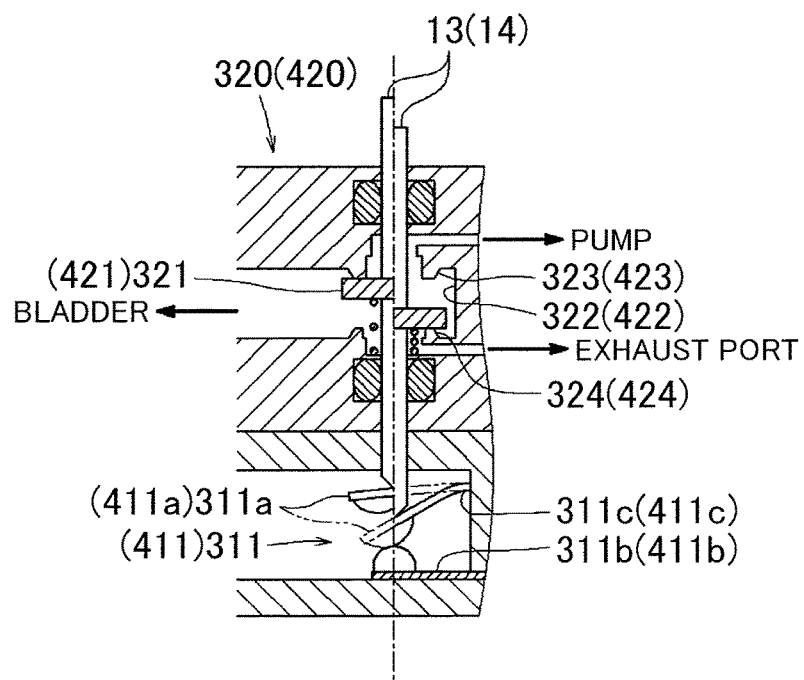
FIG. 14 is a sectional view of a switch box for an up mode and a down mode in the second embodiment.

FIG. 14 shows configurations of the switch boxes 320 and 420 in the second embodiment. Both the switch boxes 320 and 420 have the same configuration, and hence, FIG. 14 basically shows reference numerals of constituent elements of the switch box 320, and shows reference numerals of constituent elements of the switch box 420 in parentheses. FIG. 14 shows the configuration corresponding to FIG. 12 showing the switch boxes 310 and 410 in the first embodiment. As apparent from comparison between the embodiments, in the switch boxes 320 and 420 of FIG. 14, configurations of both of a switching valve and a switch element 311 (411) are the same as those in the switch boxes 310 and 410, and counterparts that communicate with spaces continuous with a valve seat 323 (423) and a valve seat 324 (424) of the switch boxes 320 and 420 are changed as compared to counterparts that communicate with spaces continuous with the valve seat 314 (414) and the valve seat 315 (415) in the switch boxes 310 and 410. That is, the counterpart (pump) that communicates with the space continuous with the valve seat 323 (423) is the same as the counterpart (pump) that communicates with the space continuous with the valve seat 315 (415), and the counterpart (exhaust port) that communicates with the space continuous with the valve seat 324 (424) is the same as the counterpart (exhaust port) that communicates with the space continuous with the valve seat 314 (414).

As described above, in the second embodiment, the switch boxes 110, 310 and 410 in the first embodiment are replaced with the switch boxes 120, 320 and 420, and as a result, an air pipe is partially changed as shown in FIG. 8. First, a connecting position between the air pipe and the upper bladder 18 and a connecting position between the air pipe and the lower bladder 19 are switched. That is, the upper bladder 18 communicates with the switching valve of the switch box 320, and the lower bladder 19 communicates with the switching valve of the switch box 420. In addition, a passage through which air of the discharge port of the pump 17 is supplied to the upper bladder 18 and the lower bladder 19 is divided into two systems, and there are disposed a passage in which the air flows through the switch box 120 and is supplied to the upper bladder 18 and the lower bladder 19 via the check valves 30 and 31, and a passage in which the air does not flow through the switch box 120, flows through the switch boxes 320 and 420 via check valves 28 and 29 and is supplied to the upper bladder 18 and the lower bladder 19.

In the second embodiment, air is supplied to and discharged from the upper bladder 18 and the lower bladder 19 in each mode, when an operating knob 15 of an operation box 10 is operated in a corresponding direction. Hereinafter, each mode will be described.

(Hold Mode) When the pusher 11 of the switch box 120 is pressed, the switch element 111 is turned on, and a motor 16 is operated. Consequently, the air is supplied from the discharge port of the pump 17, and the air flows through the switching valve of the switch box 120 and is further supplied to the upper bladder 18 and the lower bladder 19 via the check valves 30 and 31 to expand these bladders (see FIGS. 8 and 13).

(Release Mode) When a pusher 12 of a switch box 210 is pressed, the lower bladder 19 and the upper bladder 18 communicate with an exhaust port 24, and the lower bladder 19 and the upper bladder 18 are both contracted (see FIGS. 8 and 11).

(Up Mode) When a pusher 13 of the switch box 320 is pressed, the switch element 311 is turned on, and the motor 16 is operated. Therefore, the air is supplied from the discharge port of the pump 17, and the air is supplied to the upper bladder 18 via the check valve 28 and through the switching valve of the switch box 320 to expand the upper bladder 18. At this time, in the switching valve of the switch box 420, a passage through which the lower bladder 19 communicates with the discharge port of the pump 17 is cut off, and the lower bladder communicates with an exhaust port 26. In consequence, the lower bladder 19 is contracted (see FIGS. 8 and 14).

(Down Mode) When a pusher 14 of the switch box 420 is pressed, the switch element 411 is turned on, and the motor 16 is operated. Consequently, the air is supplied from the discharge port of the pump 17, and the air is supplied to the lower bladder 19 via the check valve 29 and through the switching valve of the switch box 420 to expand the lower bladder 19. At this time, in the switching valve of the switch box 320, a passage through which the upper bladder 18 communicates with the discharge port of the pump 17 is cut off, and the upper bladder communicates with the exhaust port 25. In consequence, the upper bladder 18 is contracted (see FIGS. 8 and 14).

Figure 9:
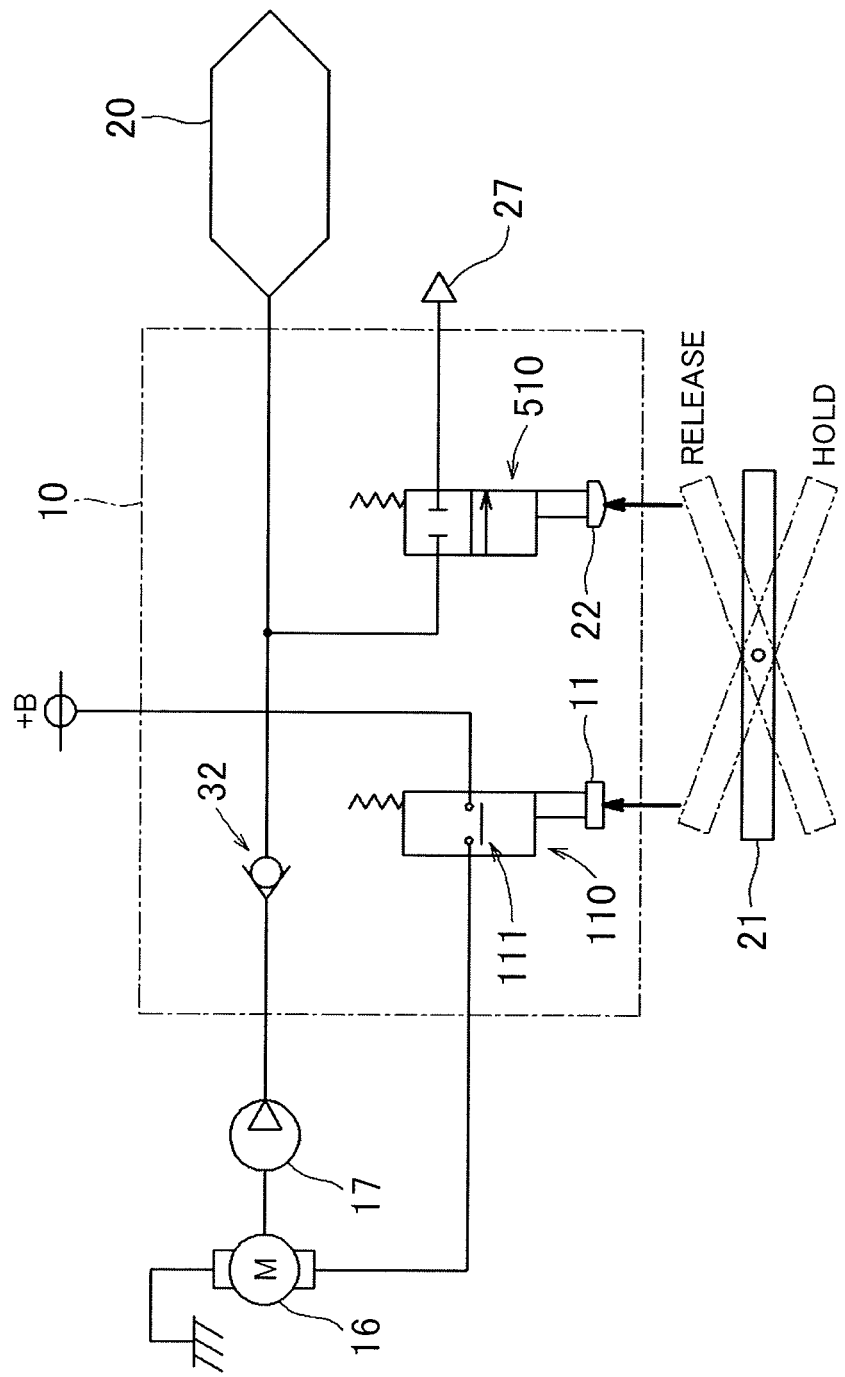
FIG. 9 is a system configuration diagram of a lumbar support in a third embodiment of the present invention.
Figure 15:
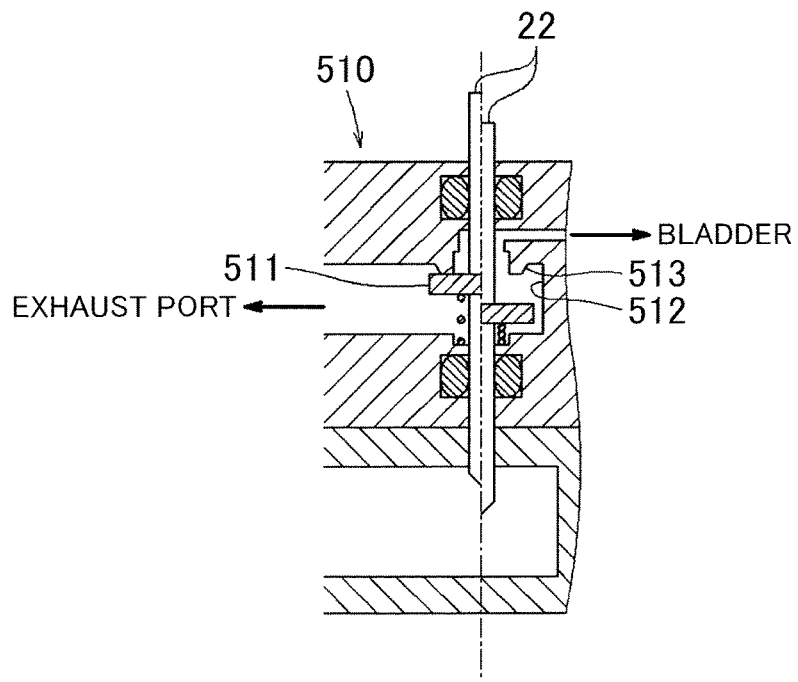
FIG. 15 is a sectional view of a switch box for a release mode in the third embodiment.

FIG. 9 shows a third embodiment of the present invention. The third embodiment is different from the first embodiment in that a lumbar support is constituted by only one bladder 20. Consequently, there are only two operation modes for the lumbar support, i.e., there are only a hold mode and a release mode. As a result, two switch boxes 110 and 510 are disposed in accordance with the respective modes, and in order to operate the switch boxes 110 and 510, a seesaw type operating knob 21 is disposed. The switch box 110 is the same as the switch box 110 in the first embodiment (see FIG. 10), and the switch box 510 shown in FIG. 15 is used. A position of the operating knob 21 for performing the hold mode corresponds to a first position according to the present invention, and a position of the operating knob 21 for performing the release mode corresponds to a second position according to the present invention.

The switch box 510 (see FIG. 15) is similar to the switch box 210 of the first embodiment (see FIG. 11). FIG. 15 shows the switch box corresponding to the switch box 210 of the first embodiment shown in FIG. 11. As apparent from comparison between both the switch boxes, two flow channels that are independent from each other communicate with the space continuous with the valve seat 213 in the switch box 210, whereas only a space that communicates with one flow channel is formed above a valve seat 513 of the switch box 510. The one flow channel communicates with the bladder 20, and a valve chamber 512 accommodating a valve element 511 of the switch box 510 communicates with a discharge port 27.

The bladder 20 communicates with a discharge port of a pump 17 via a check valve 32 without communicating with the switch boxes 110 and 510. The check valve 32 is configured to allow a flow of air from the pump 17 toward the bladder 20, and to block a flow of the air in an opposite direction. The check valve 32 prevents the air from leaking from the bladder 20 toward the pump 17 so that the bladder 20 is maintained in the expanded state.

In the third embodiment, when the operating knob 21 of an operation box 10 is operated in each direction, air is supplied to and discharged from the bladder 20 in a corresponding mode. Hereinafter, each mode will be described in detail.

(Hold Mode) When a pusher (corresponding to a first operating body according to the present invention) 11 of the switch box 110 is pressed, a switch element 111 is turned on, and a motor 16 is operated. Consequently, the air is supplied from the discharge port of the pump 17, and the air is supplied to the bladder 20 via the check valve 32 to expand the bladder 20 (see FIGS. 9 and 10).

(Release Mode) When a pusher 22 (corresponding to a second operating body according to the present invention) of the switch box 510 is pressed, the bladder 20 communicates with the discharge port 27, and the bladder 20 is contracted (see FIGS. 9 and 15).

Figure 17:
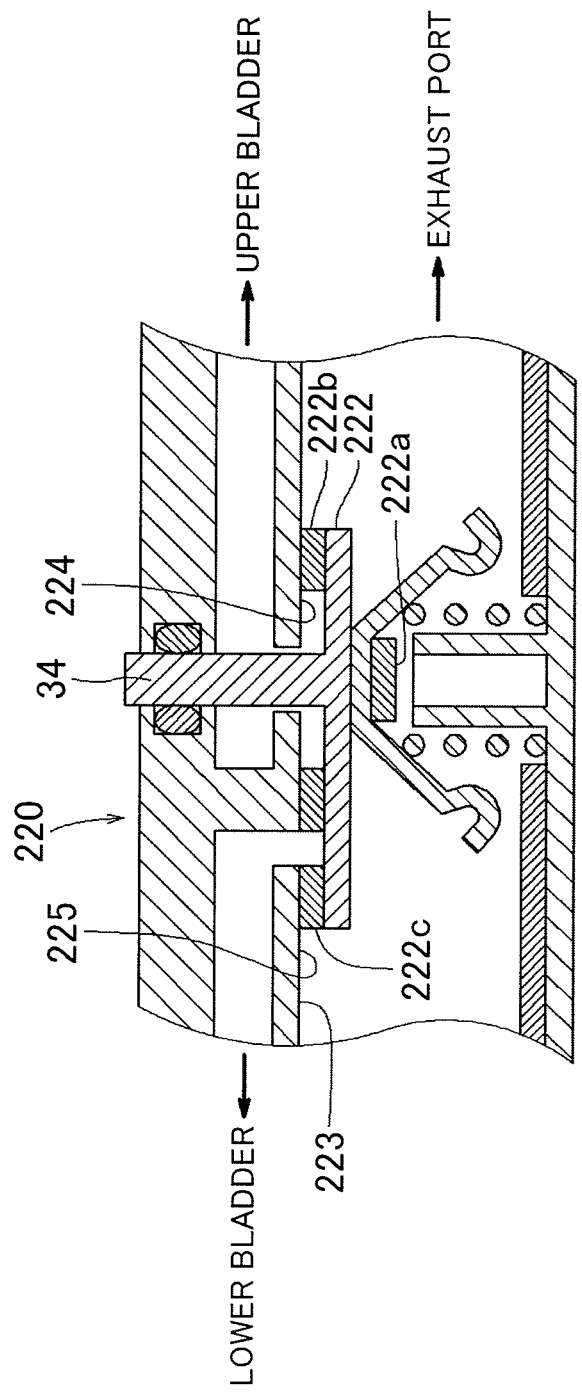
FIG. 17 is a sectional view of a switch box for a release mode in the fourth embodiment.
Figure 18:
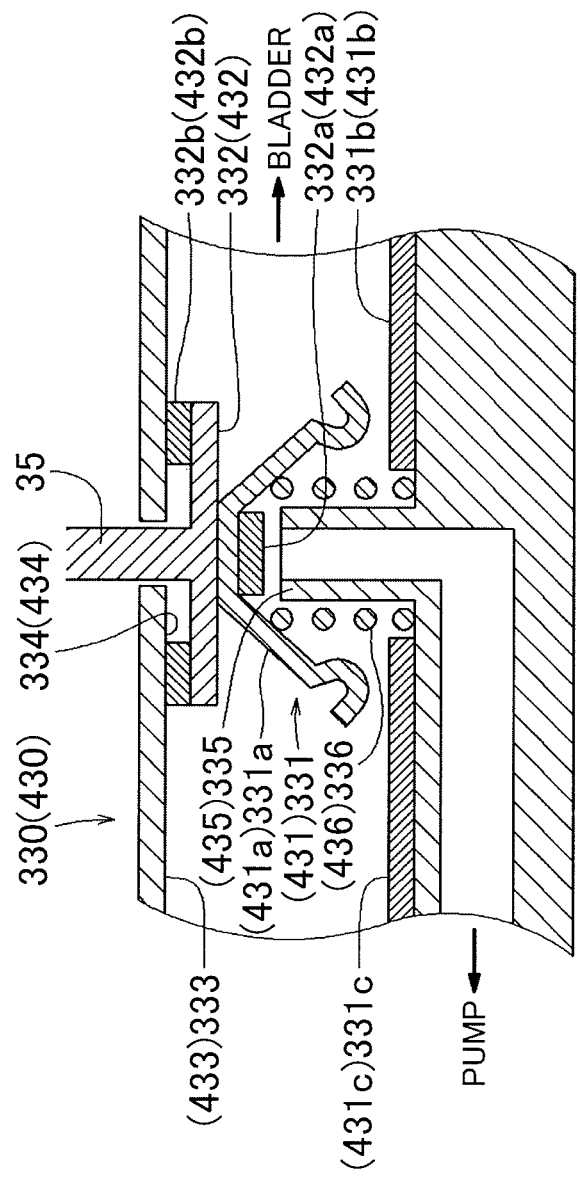
FIG. 18 is a sectional view of a switch box for an up mode and a down mode in the fourth embodiment.

FIGS. 16 to 18 show switch boxes 130, 220 and 330 (430) in a fourth embodiment of the present invention. The fourth embodiment is different from the first embodiment in that the switch boxes 110, 210 and 310 (410) in the first embodiment are replaced with the switch boxes 130, 220 and 330 (430). The other configurations in the fourth embodiment are the same as those in the first embodiment, and redundant description of the same part is omitted.

In the switch box 310 (410) of the first embodiment, as described with reference to FIG. 12, the switching valve and the switch element 311 (411) are respectively disposed in upper and lower regions in a case, whereas in the switch box 330 (430) of the fourth embodiment, a movable contact 331a (431a) of a switch element 331 (431) is integrated with a valve element 332 (432) of the switching valve. The switch box 130 does not include the switching valve, but includes a structure of a similar switching valve so that a feeling of operating the switch box 130 is the same as or similar to a feeling of operating each of the other switch boxes 220 and 330 (430). In addition, the switch box 220 does not include a switch element, but includes a structure of a similar switch element so that the feeling of operating the switch box 220 is the same as or similar to the feeling of operating each of the other switch boxes 130 and 330 (430). Here, upper and lower sides shown in FIGS. 10 to 12 are described as upper and lower sides for the sake of convenience.

In the switch box 330 (430), as shown in FIG. 18, the movable contact 331a of the switch element 331 is fixed to a lower surface of the valve element 332 fixed to a lower end of a pusher 35. A valve chamber 333 is formed to accommodate the valve element 332 and the movable contact 331a. On a surface of the valve chamber 333 which faces the valve element 332, an annular valve seat 334 is formed to surround the pusher 35. A clearance is formed between the valve seat 334 and the pusher 35, and the valve chamber 333 communicates with an exhaust port 25 in a state where the valve element 332 is separated from the valve seat 334 (see FIG. 7). Further, a seal material 332b, which has an annular shape as well as the valve seat 334, is fixed on a portion of the valve element 332 which faces the valve seat 334. The seal material 332b provides airtightness when the valve element 332 contacts (abuts on) the valve seat 334. A seal material 332a is fixed to a lower surface of the movable contact 331a, and a valve seat 335 having a tubular shape is formed to project toward the seal material 332a such that the valve seat 335 faces the lower side of the seal material 332a. A flow channel formed by the tubular valve seat 335 communicates with the discharge port of the pump 17 (see FIG. 7). When the seal material 332a contacts the valve seat 335, the seal material 332a maintains an airtight state of a communication path.

Fixed contacts 331b and 331c of the switch element 331 are disposed along the valve chamber 333 at positions on both sides of the valve seat 335. The movable contact 331a is disposed such that both ends of the movable contact 331a that straddle the valve seat 335 face the fixed contacts 331b and 331c. A spring 336 is disposed around the tubular valve seat 335, and the spring 336 urges the valve element 332 and the movable contact 331a upward. Consequently, the seal material 332b on the valve element 332 normally contacts the valve seat 334, and the seal material 332a on the lower surface of the movable contact 331a is normally separated from the valve seat 335. In addition, the both ends of the movable contact 331a are normally separated from the fixed contacts 331b and 331c. On the other hand, when the pusher 35 is pressed and operated, the seal material 332b on the valve element 332 is separated from the valve seat 334, and the seal material 332a on the lower surface of the movable contact 331a contacts the valve seat 335. Additionally, the both ends of the movable contact 331a contact the fixed contacts 331b and 331c to electrically come into contact with the fixed contacts 331b and 331c. The above configuration is also common to the switch box 430, and hence FIG. 18 shows reference numerals of respective constituent elements of the switch box 430 in parentheses.

Figure 22:
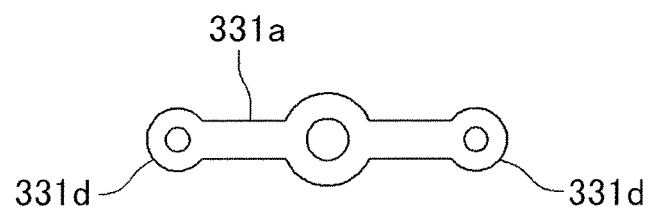
FIG. 22 is a plan view of a movable contact of the switch box in the fourth embodiment.
Figure 23:
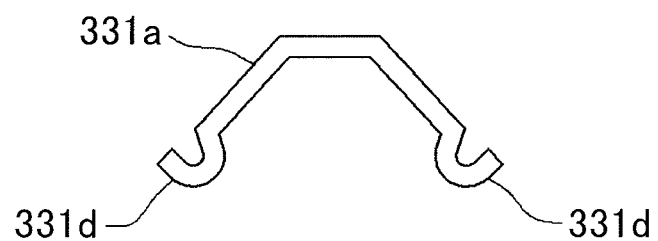
FIG. 23 is a front view of the movable contact of FIG. 22.

FIGS. 22 and 23 show only the movable contact 331a of the switch box 330. The movable contact 331a is formed of a spring material, and portions of both ends 331d of the movable contact 331a which contact the fixed contacts 331b and 331c are curved and formed into a projecting shape toward the fixed contacts 331b and 331c so that the both ends 331d of the movable contact 331a are slidable in a state where the both ends 331d contact the fixed contacts 331b and 331c. In addition, the movable contact 331a is configured to ensure both of an abutment pressure of the seal material 332a on the valve seat 335 and a contact pressure of the both ends 331d of the movable contact 331a on the fixed contacts 331b and 331c. Thus, the movable contact 331a is configured such that the both ends 331d of the movable contact 331a contact the fixed contacts 331b and 331c, and then, the movable contact 331a is deformed to increase a space between the both ends 331d, and the seal material 332a contacts the valve seat 335. It is to be noted that structures of movable contacts of the switch boxes 110, 210 and 410 are the same as the structure of the movable contact 331a of the switch box 330.

Figure 24:
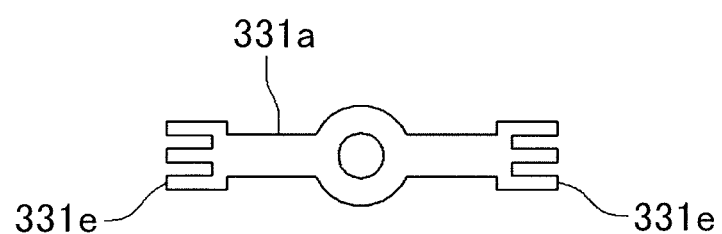
FIG. 24 is a plan view of a modified example of the movable contact of FIG. 22.
Figure 25:
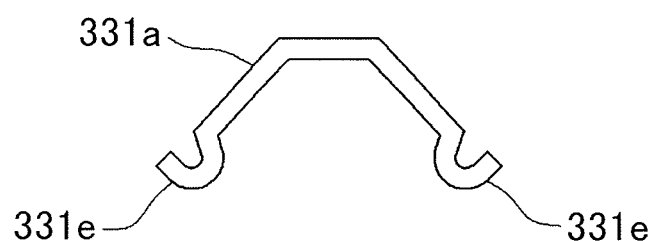
FIG. 25 is a front view of the movable contact of FIG. 24.

FIGS. 24 and 25 show a modified example of the movable contact 331a in FIGS. 22 and 23. As apparent from comparison between FIG. 24 and FIG. 22, in the modified example of FIG. 24, each of both ends 331e of the movable contact 331a is formed to branch off in a fork shape. With this shape, each end 331e of the movable contact 331a comes in contact with a corresponding one of the fixed contacts 331b and 331c (see FIG. 18) at three positions, and hence a reliability of the contact can be improved.

As another modified example of the switch element 331, a membrane switch (not shown) may be employed.

The switch box 130 of FIG. 16 has substantially the same configuration as the configuration of the switch box 330. However, in the switch box 130, only a switch element 131 effectively functions, and the function of the switching valve is not required. Therefore, the switch box is configured such that according to presence or absence of a pressing operation of a pusher 33, a movable contact 131a of the switch element 131 contacts fixed contacts 131b and 131c or moves away from the fixed contacts to turn on or off a switch.

The switch box 220 of FIG. 17 has substantially the same configuration as the configuration of the switch box 330. However, in the switch box 220, the function of the switch element is not required, and hence only a switching valve effectively functions. On an upper side of a valve element 222, an annular seal material 222b similar to the seal material 332b of the switch box 330 is disposed, and another seal material 222c is disposed adjacent to the seal material 222b. A space continuous with a valve seat 224 that faces the seal material 222b communicates with an upper bladder 18, and a space continuous with a valve seat 225 that faces the seal material 222c communicates with a lower bladder 19 (see FIG. 7). The space continuous with the valve seat 224 is formed independently of the space continuous with the valve seat 225. Further, a valve chamber 223 accommodating the valve element 222 communicates with an exhaust port 24 (see FIG. 7).

The switch boxes 130, 220 and 330 (430) in the fourth embodiment function entirely similarly to the switch boxes 110, 210 and 310 (410) in the first embodiment, and the switch boxes 130, 220 and 330 (430) in the fourth embodiment supply and discharge air to and from the upper bladder 18 and the lower bladder 19 in accordance with an operation of an operating knob 15.

Figure 19:
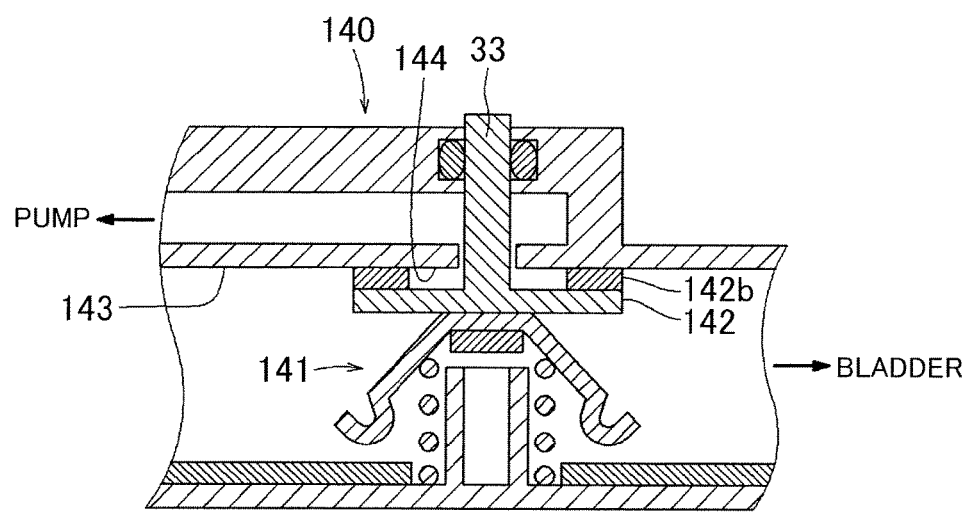
FIG. 19 is a sectional view of a switch box for a hold mode in a fifth embodiment.
Figure 20:
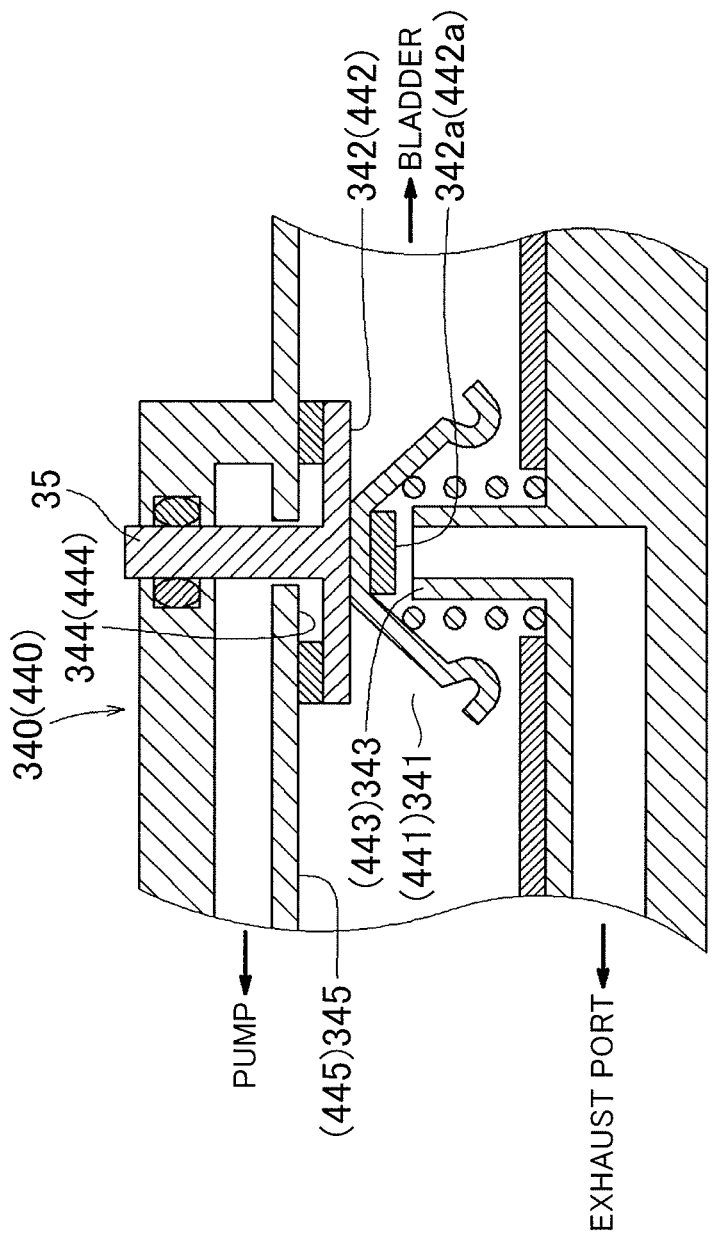
FIG. 20 is a sectional view of a switch box for an up mode and a down mode in the fifth embodiment.

FIGS. 19 and 20 show switch boxes 140 and 340 (440) in a fifth embodiment of the present invention. The fifth embodiment is different from the fourth embodiment as follows. The switch box 130 of the fourth embodiment (see FIG. 16) does not have the function of the switching valve, whereas the switch box 140 includes the function of the switching valve. A switching mode in the switching valve of the switch box 330 (430) of the fourth embodiment (see FIG. 18) is changed to be opposite in the switching valve of the switch box 340 (440) of the fifth embodiment. Further, the switch boxes 140 and 340 (440) in the fifth embodiment are incorporated in the system configuration of the second embodiment (see FIG. 8). It is to be noted that in the case of the fifth embodiment, as the switch box 210 of the system configuration of FIG. 8, the switch box 220 of FIG. 17 is used.

In the switch box 140, as shown in FIG. 19, an annular valve seat 144 that surrounds a pusher 33 is formed in the surface of a valve chamber 143 which faces a valve element 142. A clearance is formed between the valve seat 144 and the pusher 33, and a flow channel that communicates with a space continuous with (linked to) the valve seat 144 via this clearance communicates with a discharge port of a pump 17.

Further, an annular seal material 142b is fixed to a portion of the valve element 142 which faces the valve seat 144, and thus, air tightness is ensured (provided) when the valve element 142 contacts (abuts on) the valve seat 144. In addition, the valve chamber 143 communicates with an upper bladder 18 and a lower bladder 19 via check valves 30 and 31 (see FIG. 8). In the switch box 140, the configuration of a switch element 141 is identical to the configuration of the switch element 131 of the switch box 130 (see FIG. 16).

In the switch box 340 (440), as shown in FIG. 20, a valve seat 344 is formed in an inner wall surface of a valve chamber 345 which faces a valve element 342. A clearance is formed between the valve seat 344 and a pusher 35, and a flow channel that communicates with a space continuous with (linked to) the valve seat 344 via this clearance communicates with the discharge port of the pump 17. A flow channel of a space continuous with (linked to) a valve seat 343, on which a seal material 342a on a lower surface of a switch element 341 abuts, communicates with an exhaust port 25 (see FIG. 8). The configuration of the switch box 340 (440) is the same as that of the switch box 330 (430) (see FIG. 18) except the configuration described here, and hence descriptions of the same contents are omitted. The configuration concerning the switch box 340 is also common to the switch box 430, and hence FIG. 20 shows reference numerals of respective constituent elements of the switch box 430 in parentheses.

The switch boxes 140, 220 and 340 (440) in the fifth embodiment function entirely similarly to the switch boxes 120, 210 and 320 (420) in the second embodiment, and the switch boxes 140, 220 and 340 (440) in the fifth embodiment supply and discharge air to and from the upper bladder 18 and the lower bladder 19 in accordance with an operation of an operating knob 15.

Figure 21:
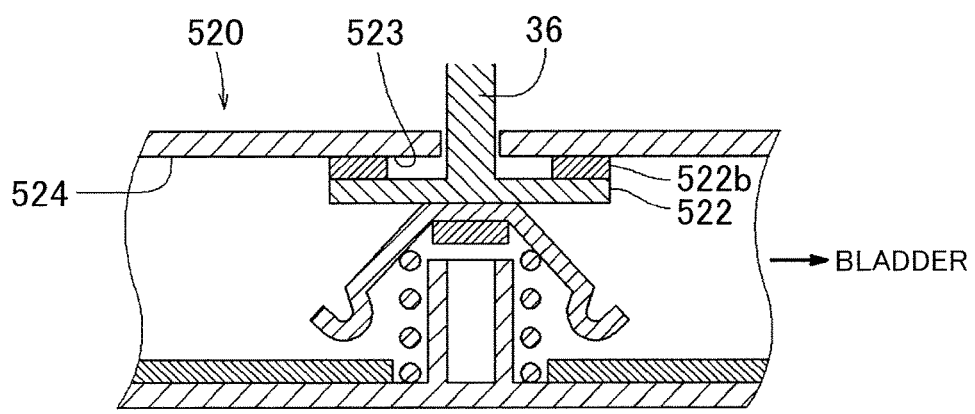
FIG. 21 is a sectional view of a switch box for a release mode in a sixth embodiment.

FIG. 21 shows a switch box 520 in a sixth embodiment of the present invention. The sixth embodiment is different from the third embodiment in that the switch boxes 110 and 510 in the third embodiment are replaced with the switch boxes 130 (see FIG. 16) and 520. The other configurations in the sixth embodiment are the same as those in the third embodiment, and redundant description of the same part is omitted. The switch box 130 is configured as described above.

In the switch box 520, as shown in FIG. 21, the valve seat 225 of the switch box 220 in FIG. 17 is omitted, and an annular valve seat 523 that surrounds a pusher 36 is formed in the surface of a valve chamber 524 which faces a valve element 522. A clearance is formed between the valve seat 523 and the pusher 36, and a space linked to the valve seat 523 via this clearance communicates with a discharge port 27 (see FIG. 9). Further, an annular seal material 522b is fixed to a portion of the valve element 522 which faces the valve seat 523, and airtightness is ensured (provided) when the valve element 522 contacts (abuts on) the valve seat 523.

The sixth embodiment functions entirely similarly to the third embodiment, and the switch boxes 130 and 520 function in accordance with an operation of an operating knob 21 to supply and discharge air to and from a bladder 20.

The specific embodiments have been described above, but the present invention is not limited to these appearances and configurations in the embodiments, and various changes, additions and deletions may be made without departing from the scope of the present invention. For example, in the above embodiments, the present invention is applied to a seat of an automobile, but may be applied to a seat that is mounted in an aircraft, a vessel, a train or the like. Additionally, in the above embodiments, the present invention is applied to the lumbar support, but may be applied to a massage device, a side support or the like.

What is claimed is:

1. A vehicle seat comprising:
   a bladder as an actuator;
   a pump that is operated to supply air to the bladder;
   a switch that is operated to operate the pump; and
   a switching valve that is disposed in an air supply/discharge passage for the air for the bladder, the switching valve being configured to connect the air supply/discharge passage to a discharge port of the pump when the air is supplied to the bladder, and to connect the air supply/discharge passage to an exhaust port when the air is discharged from the bladder,
   wherein the switching valve is incorporated in the switch, and is configured to receive an operating force applied to the switch, and to supply and discharge the air to and from the bladder in accordance with an operation of the switch; and
   a check valve configured to allow a flow of the air from the pump toward the bladder and to block a flow of the air in an opposite direction is provided between the discharge port of the pump and the air supply/discharge passage for the bladder.

2. The vehicle seat according to claim 1, wherein:
   the air supply/discharge passage for the bladder is normally connected to the discharge port of the pump;
   the switch is configured to be switched between a first position to supply the air to the bladder and a second position to discharge the air from the bladder;
   when the switch is at the first position, a movable contact of the switch is electrically brought into contact with a fixed contact of the switch to bring an operating circuit for the pump into a conductive state, in accordance with movement of a first operating body that has received the operating force; and
   when the switch is at the second position, a valve element that has cut off communication between the air supply/discharge passage for the bladder and the exhaust port is moved to provide communication between the air supply/discharge passage for the bladder and the exhaust port, in accordance with movement of a second operating body that has received the operating force.

3. The vehicle seat according to claim 1, wherein:
   the bladder includes a pair of bladders, and each of the pair of bladders is configured to be individually expandable and contractible;
   the switch is configured to be switched to a first position to simultaneously expand the pair of bladders, a second position to simultaneously contract the pair of bladders, a third position to expand one of the pair of bladders and contract the other bladder, and a fourth position to contract the one of the pair of bladders and expand the other bladder;
   when the switch is at the first position, a first movable contact of the switch is electrically brought into contact with a first fixed contact of the switch to bring an operating circuit for the pump into a conductive state, in accordance with movement of a first operating body that has received the operating force;
   when the switch is at the second position, a second valve element that has cut off communication between each of the air supply/discharge passages for the pair of the bladders and the exhaust port is moved to provide the communication between each of the air supply/discharge passages for the pair of bladders and the exhaust port, in accordance with movement of a second operating body that has received the operating force;

when the switch is at the third position, in accordance with movement of a third operating body that has received the operating force, a second movable contact of the switch is electrically brought into contact with a second fixed contact of the switch to bring the operating circuit for the pump into the conductive state, and a third valve element that has provided communication between the air supply/discharge passage for the other bladder and the discharge port of the pump, and has cut off communication between the air supply/discharge passage for the other bladder and the exhaust port is moved to cut off the communication between the air supply/discharge passage for the other bladder and the discharge port of the pump, and to provide the communication between the air supply/discharge passage for the other bladder and the exhaust port; and when the switch is at the fourth position, in accordance with movement of a fourth operating body that has received the operating force, a third movable contact of the switch is electrically brought into contact with a third fixed contact of the switch to bring the operating circuit for the pump into the conductive state, and a fourth valve element that has provided communication between the air supply/discharge passage for the one bladder and the discharge port of the pump and has cut off communication between the air supply/discharge passage for the one bladder and the exhaust port is moved to cut off the communication between the air supply/discharge passage for the one bladder and the discharge port of the pump, and to provide the communication between the air supply/discharge passage for the one bladder and the exhaust port.

4. The vehicle seat according to claim 1, wherein:

the bladder includes a pair of bladders, and each of the pair of bladders is configured to be individually expandable and contractible;

the switch is configured to be switched to a first position to simultaneously expand the pair of bladders, a second position to simultaneously contract the pair of bladders, a third position to expand one of the pair of bladders and contract the other bladder, and a fourth position to contract the one of the pair of bladders and expand the other bladder;

when the switch is at the first position, in accordance with movement of a first operating body that has received the operating force, a first movable contact of the switch is electrically brought into contact with a first fixed contact of the switch to bring an operating circuit for the pump into a conductive state, and a first valve element that has cut off communication between each of the air supply/discharge passages for the pair of bladders and the discharge port of the pump is moved to provide the communication between each of the air supply/discharge passages for the pair of bladders and the discharge port of the pump;

when the switch is at the second position, in accordance with movement of a second operating body that has received the operating force, a second valve element that has cut off communication between each of the air supply/discharge passages for the pair of bladders and the exhaust port is moved to provide the communication between each of the air supply/discharge passages for the pair of bladders and the exhaust port;

when the switch is at the third position, in accordance with movement of a third operating body that has received the operating force, a second movable contact of the switch is electrically brought into contact with a second fixed contact of the switch to bring the operating circuit for the pump into the conductive state, and a third valve element that has cut off communication between the air supply/discharge passage for the one bladder and the discharge port of the pump, and has provided communication between the air supply/discharge passage for the one bladder and the exhaust port is moved to provide the communication between the air supply/discharge passage for the one bladder and the discharge port of the pump, and to cut off the communication between the air supply/discharge passage for the one bladder and the exhaust port; and when the switch is at the fourth position, in accordance with movement of a fourth operating body that has received the operating force, a third movable contact of the switch is electrically brought into contact with a third fixed contact of the switch to bring the operating circuit for the pump into the conductive state, and a fourth valve element that has cut off communication between the air supply/discharge passage for the other bladder and the discharge port of the pump and has provided communication between the air supply/discharge passage for the other bladder and the exhaust port is moved to provide the communication between the air supply/discharge passage for the other bladder and the discharge port of the pump, and to cut off the communication between the air supply/discharge passage for the other bladder and the exhaust port.

5. The vehicle seat according to claim 1, wherein the switch includes:

a fixed contact;

a movable contact that receives the operating force to move relative to the fixed contact and to electrically come in contact with the fixed contact;

a valve element disposed to move together with the movable contact;

a valve chamber that accommodates the valve element such that the valve element is movable, and communicates with one of the bladder, the exhaust port and the discharge port of the pump; and a valve seat that is formed in an inner wall surface of the valve chamber to constitute an end portion of a communication path communicating with one of the bladder, the exhaust port and the discharge port of the pump which does not communicate with the valve chamber, the valve seat being disposed to face the valve element such that the valve seat is able to contact the valve element, and the communication path is opened to the valve chamber in a state where the valve seat does not contact the valve element, and the communication path is cut off from the valve chamber in a state where the valve seat contacts the valve element.

6. The vehicle seat according to claim 5, wherein the switch includes at least one of a combination of the fixed contact and the movable contact and a combination of the valve element and the valve seat.

* * * * *